(12) United States Patent
Utaki et al.

(10) Patent No.: US 7,513,096 B2
(45) Date of Patent: Apr. 7, 2009

(54) CABLE PROTECTION AND GUIDE DEVICE

(75) Inventors: Akihiko Utaki, Osaka (JP); Masaaki Ikeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 63 days.

(21) Appl. No.: 11/701,960

(22) Filed: Feb. 2, 2007

(65) Prior Publication Data

US 2007/0241239 A1 Oct. 18, 2007

(30) Foreign Application Priority Data

Apr. 14, 2006 (JP) .............................. 2006-112087

(51) Int. Cl.
*F16G 13/16* (2006.01)
*F16G 3/04* (2006.01)
(52) U.S. Cl. ............................ 59/78.1; 59/900; 248/49; 248/51
(58) Field of Classification Search ................ 59/78.1, 59/900; 248/49, 51
See application file for complete search history.

(56) References Cited

U.S. PATENT DOCUMENTS

| 5,038,556 | A | 8/1991 | Moritz et al. |
| 5,048,283 | A | 9/1991 | Moritz et al. |
| 5,184,454 | A | 2/1993 | Klein et al. |
| 5,635,675 | A | 6/1997 | Houga |
| 5,768,882 | A | 6/1998 | Weber et al. |
| 6,094,902 | A | 8/2000 | Drews et al. |

(Continued)

FOREIGN PATENT DOCUMENTS

JP 09-177902 7/1997

(Continued)

OTHER PUBLICATIONS

U.S. Appl. No. 11/699,929, Utaki et al., Entire Document.

(Continued)

*Primary Examiner*—David B Jones
(74) *Attorney, Agent, or Firm*—Woodling, Krost and Rust

(57) ABSTRACT

A cable protection and guide device in which contact impact noise between adjacent side plates is dispersed. The noise is liable to occur at the time of linear position holding and at the time of flexional position restriction when cables accommodated therein are transmitted or moved from a mounting fixed end toward a mounting movable end. A number of pairs of right and left side plate units (110) are connected from a mounting fixed end to a mounting movable end and side plate unit comprises a side plate front portion (111) which is connected to a preceding side plate unit (110), a side plate rear portion (112) which is connected to a subsequent side plate unit (110), and a flexible coupling portion (113) integrally intervened between the side plate front portion (111) and the side plate rear portion (112). The side plate unit 110 includes an outer circumferential side linear position holding mechanism Xo and an outer circumferential side flexional position restricting mechanism Yo at a side plate front portion (111) on a flexional outer circumferential side rather than the coupling portion (113). The side plate also includes an inner circumferential side flexional position restricting mechanism Yi and an inner circumferential side linear position holding mechanism Xi at a side plate rear portion (112) on a flexional inner circumferential side rather than the coupling portion (113).

18 Claims, 7 Drawing Sheets

U.S. PATENT DOCUMENTS

| | | | |
|---|---|---|---|
| 6,128,893 A | 10/2000 | Weber et al. | |
| 6,459,037 B2 * | 10/2002 | Muller et al. | 59/78.1 |
| 6,516,602 B2 | 2/2003 | Sakai et al. | |
| 6,550,232 B1 | 4/2003 | Achs et al. | |
| 6,708,480 B1 * | 3/2004 | Wehler | 59/78.1 |
| 6,725,642 B2 | 4/2004 | Tsutsumi et al. | |
| 6,745,555 B2 * | 6/2004 | Hermey et al. | 59/78.1 |
| 6,864,425 B2 | 3/2005 | Ikeda et al. | |
| 6,978,595 B2 | 12/2005 | Mendenhall et al. | |
| 6,984,782 B2 | 1/2006 | Ikeda et al. | |
| 7,047,720 B2 | 5/2006 | Ikeda et al. | |
| 7,204,075 B2 | 4/2007 | Utaki | |
| 7,305,815 B2 * | 12/2007 | Utaki et al. | 59/78.1 |
| 7,317,160 B2 | 1/2008 | Utaki | |
| 7,392,650 B2 | 7/2008 | Utaki | |
| 2008/0120958 A1 | 5/2008 | Utaki et al. | |
| 2008/0184693 A1 | 8/2008 | Utaki et al. | |

FOREIGN PATENT DOCUMENTS

| | | |
|---|---|---|
| JP | 10-047441 | 2/1998 |
| JP | 2000-120807 | 4/2000 |

OTHER PUBLICATIONS

U.S. Appl. No. 11/699,912, Utaki et al., Entire Document.
U.S. Appl. No. 12/016,832, Utaki et al., Entire Document.
U.S. Appl. No. 12/098,426, Utaki et al., Entire Document.

* cited by examiner

CABLE PROTECTION AND GUIDE DEVICE

Priority is claimed to Japanese Patent Application No. 2006-112087 filed Apr. 14, 2006.

TECHNICAL FIELD

The present invention relates to a cable or the like protection and guide device. More specifically it relates to a cable or the like protection and guide device suitable for accommodating a cable or a hose which supplies a movable member of an industrial machine with electric power or compressed air in a safe and reliable manner.

BACKGROUND TECHNOLOGY

As a conventional cable and guide device, a cable chain is known in which the device comprises a number of chain unit members each having a supporting plate integrally formed so that said supporting plate connects one lower portion of a pair of spaced and opposed side plates to the other lower portion thereof. The conventional device also includes closing members each covering an upper opening of a chain unit member and elastic connecting members each connecting supporting plates in adjacent chain unit members in the longitudinal direction. The device flexes and guides a control signal transmission means accommodated while flexing the chain unit members. See, for example, Patent Reference 1 is Japanese Laid-Open Patent Publication No. Hei 9-177902.

DISCLOSURE OF THE INVENTION

Problems to be Solved by the Invention

However, when a cable chain guides the control signal transmission means accommodated in the chain, the unit members which sequentially move the control transmission means must sequentially return mutually flexed chain unit members to a linearly connected state. In this case, adjacent side walls of the mutually flexed chain unit members are brought into contact with each other at their entire end surfaces whereby wear loss and impact noise due to their contact occurs.

Accordingly, the object of the present invention is to solve the above-mentioned problems. That is, the main object of the present invention is to provide a cable protection and guide device in which contact impact noise between adjacent side plate units is suppressed. The contact impact noise is liable to occur at the time of linear position holding and at the time of flexional position restriction when the accommodated cables are transmitted or moved from a mounting fixed end toward a mounting movable end.

Means for Solving the Problems

The invention attains the above-mentioned object by providing a cable protection and guide device in which a number of pairs of right and left spaced side plate units are connected to each other from a mounting fixed end toward a mounting movable end. Connecting plates are detachably bridged over flexional inner circumferential sides and flexional outer circumferential sides of the side plate units in predetermined intervals such that a cable is accommodated in a cable accommodating space surrounded by the side plate units and the connecting plates from the mounting fixed end toward the mounting movable end. The side plate unit comprises a side plate front portion which is connected to a preceding side plate unit, a side plate rear portion which is connected to a subsequent side plate unit, and a flexible coupling portion integrally intervened between the side plate front portion and the side plate rear portion. The side plate unit includes an outer circumferential side linear position holding mechanism and an outer circumferential side flexional position restricting mechanism at a side plate front portion on a flexional outer circumferential side rather than the coupling portion. The side plate further includes an inner circumferential side flexional position restricting mechanism and an inner circumferential side linear position holding mechanism at a side plate rear portion on a flexional inner circumferential side rather than the coupling portion.

The invention further attains the above-mentioned object by arranging the inner circumferential side linear position holding mechanism so that it abuts on a pair of adjacent side plate units at an earlier time than the outer circumferential side linear position holding mechanism The invention attains the above-mentioned object by arranging the inner circumferential side flexional position restricting mechanism so that it abuts a pair of adjacent side plate units at an earlier time than the outer circumferential side flexional position restricting mechanism.

The invention attains the above-mentioned object by arranging the outer circumferential side linear position holding mechanism and the outer circumferential side flexional position restricting mechanism such that each of them includes a larger abutment surface than the inner circumferential side linear position holding mechanism and the inner circumferential side flexional position restricting mechanism.

The invention attains the above-mentioned object by arranging the inner circumferential side linear position holding mechanism and the inner circumferential side flexional position restricting mechanism wherein they are each composed of an at least elastically deformable stop member.

Further the invention attains the above-mentioned object wherein the stop member includes a first stop surface which abuts in a preceding manner, and a second stop member, abuts more slowly than the first stop member.

Further the invention further attains the above-mentioned object in that at least a coupling portion and a stop member of the side unit are molded by use of a fatigue resistant resin material of a polyamide resin or a polybutylene terephthalate resin formulated with a component of elastomer or rubber.

Effects of the Invention

According to the cable protection and guide device, since a number of pairs of right and left spaced side plate units are connected to each other from a mounting fixed end toward a mounting movable end and connecting plates are detachably bridged over flexional inner circumferential sides and flexional outer circumferential sides of said side plate units in predetermined intervals, a cable can be accommodated in a cable accommodating space surrounded by the side plate units and the connecting plates from the mounting fixed end toward the mounting movable end.

Further, since the side plate unit comprises a side plate front portion which is connected to a preceding side plate unit, a side plate rear portion which is connected to a subsequent side plate unit, and a flexible coupling portion integrally intervened between the side plate front portion and the side plate rear portion, the coupling portion flexibly adapts to repeated flexions whereby breakage at the coupling portion of the side plate unit due to repeated flexional operations is eliminated and excellent fatigue resistance can be exhibited. Wear powders are restricted so that the cable or the like protection and guide device can be preferably used in a clean environment.

In the cable protection and guide device, since the side plate unit includes an outer circumferential side flexional position restricting mechanism at a side plate front portion on a flexional outer circumferential side rather than said coupling portion, and since the side plate unit includes an inner circumferential side flexional position restricting mechanism at a side plate rear portion on a flexional inner circumferential side rather than said coupling portion, when a cable or the like protection and guide device is transferred from the linear position holding state to the flexional position restricting state, the contact position between the adjacent side plate units is divided into two parts on a flexional outer circumferential side and a flexional inner circumferential side with a coupling portion sandwiched therebetween. And, since the side plate unit includes an outer circumferential side linear position holding mechanism at a side plate front portion on a flexional outer circumferential side rather than said coupling portion, and since the side plate includes an inner circumferential side linear position holding mechanism at a side plate rear portion at a flexional inner circumferential side rather than the coupling portion when a cable is transferred from the flexional position restricting state to the linear position holding state, the contact position between the adjacent side plate units is divided into two parts on a flexional outer circumferential side and a flexional inner circumferential side with a coupling portion sandwiched therebetween. Thus, even if the cable protection and guide device is transferred to a flexional position restricting state or a linear position holding sate, the contact impact force is dispersed so that noise reduction can be accomplished.

According to the invention, since the inner circumferential side linear position holding mechanism is arranged so that it abuts on a pair of adjacent side plate units at an earlier time than the outer circumferential side linear position holding mechanism, when adjacent side plate units are transferred from the flexional position restricting state to the linear position holding state, the contact position between the adjacent side plate units is divided into two parts on a flexional outer circumferential side and a flexional inner circumferential side. The timing of the contact noise is shifted so that a peak sound and periodical sounds are suppressed and noise reduction is accomplished.

According to the invention, since the inner circumferential side flexional position restricting mechanism is arranged so that it abuts on a pair of adjacent side plate units at an earlier time than the outer circumferential side flexional position restricting mechanism, when a cable protection and guide device is transferred from the linear position holding state to the flexional position restricting state, the contact position between adjacent side plate units is divided into two parts on a flexional outer circumferential side and a flexional inner circumferential side and the timing of the contact impact noise is shifted so that a peak sound and periodical sounds are suppressed and noise reduction can be accomplished.

According to the invention, since the outer circumferential side linear position holding mechanism and the outer circumferential side flexional position restricting mechanism each includes a larger abutment surface than the inner circumferential side linear position holding mechanism and the inner circumferential side flexional position restricting mechanism, when a cable protection and guide device is transferred from the linear position holding state to the flexional position restricting state or from the flexional position restricting state to the linear position holding state, even if large impact force is loaded on the outer circumferential side rather than the inner circumferential side, impact surface pressure against the large impact force is reduced to the same level as on the inner circumferential side. Thus, a reliable restriction of the flexional position or a reliable holding of the linear position is accomplished and wear of the outer circumferential side linear position holding mechanism and the outer circumferential side flexional position restricting mechanism can be prevented.

According to the invention, since the inner circumferential side linear position holding mechanism and the inner circumferential side flexional position restricting mechanism are each composed of an at least elastically deformable stop member, when a cable protection and guide device is transferred from the linear position holding state to the flexional position restricting state or from the flexional position restricting state to the linear position holding state, a stop member first absorbs contact impact force loaded on the inner circumferential side so that contact impact noise can be reduced and wear and tear of the stop member is prevented so that excellent fatigue resistance can be exhibited.

According to the invention, since the stop member includes a first stop surface which abuts in a preceding manner and a second stop surface which abuts more slowly than the first stop surface, when a cable is transferred from the linear position holding state to the flexional position restricting state or from the flexional position restricting state to the linear position holding state, the contact impact force is loaded on the stop member in two stages on the first stop surface and then on the second stop surface. Thus a concentrated load of the contact impact force is avoided so that excellent fatigue resistance can be exhibited and noise reduction can be accomplished.

According to the invention, since at least a coupling portion and a stop member of the side unit are molded by use of a fatigue resistant resin material of a polyamide resin or a polybutylene terephthalate resin formulated with a component of elastomer or rubber, the component of elastomer and rubber formulated in the polyamide resin or polybutylene terephthalate adds flexibility. Thus excellent fatigue resistance of the stop member to repeated flexions is exhibited.

These and other objects will be better understood when reference is made to the Brief Description of the Drawings and the Claims which follow hereinbelow.

Figure 1:
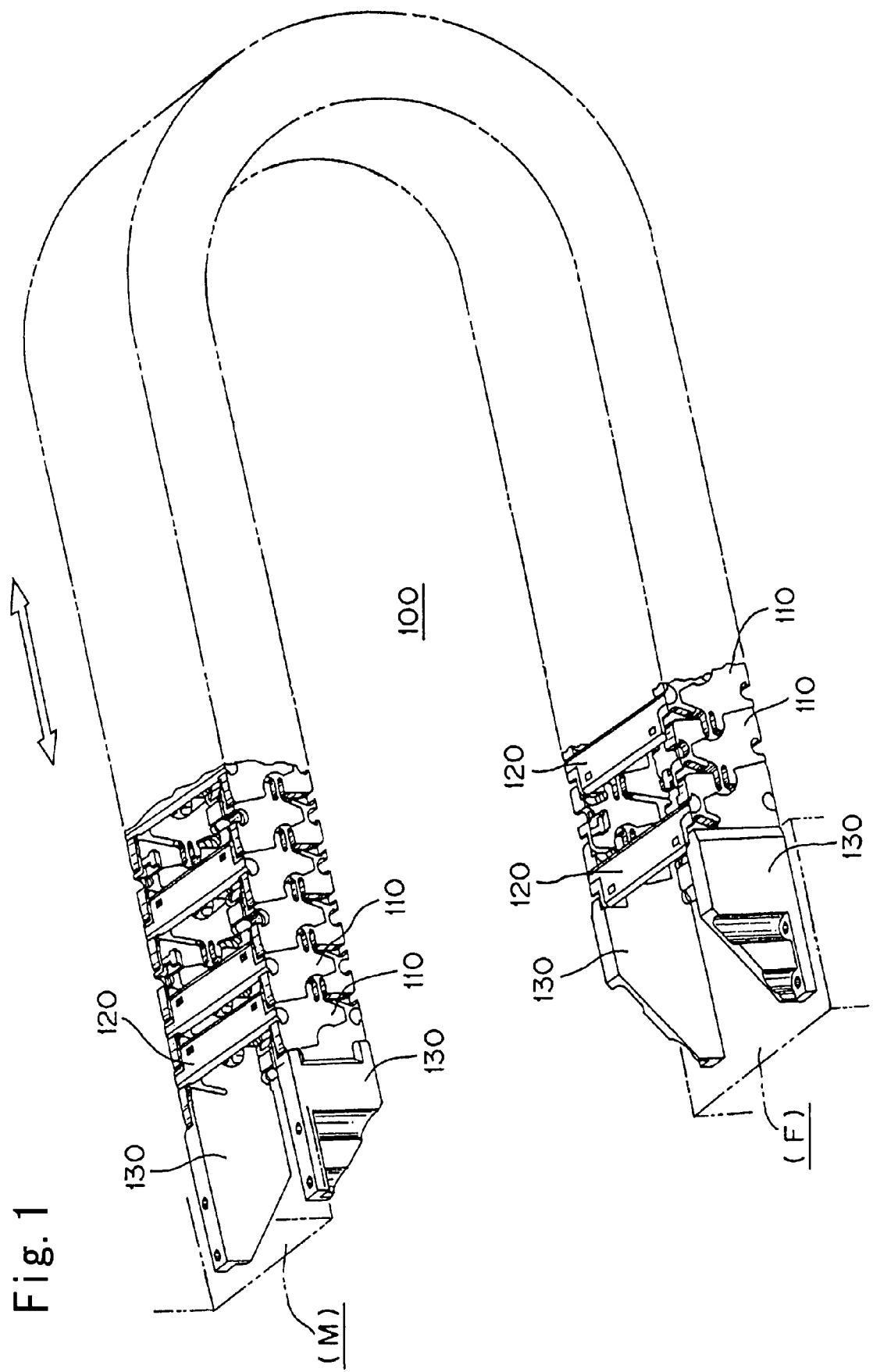
FIG. 1 is an entire view showing a use form of a cable or the like protection and guide device 100, which is an example according to the present invention.

Contact impact noise of a side plate unit is dispersed and suppressed at the time of linear position holding and at the time of flexional position restriction when an accommodated cable is transferred from a mounting fixed end toward a mounting movable end. Noise reduction is accomplished and excellent fatigue resistance of the side plate unit is exhibited. A cable protection and guide device is disclosed in which a number of pairs of right and left spaced side plate units are connected to each other from a mounting fixed end toward a mounting movable end and connecting plates are detachably bridged over flexional inner circumferential sides and flexional outer circumferential sides of said side plate units in predetermined intervals so that a cable is accommodated in a cable accommodating space surrounded by the side plate units and the connecting plates from the mounting fixed end toward the mounting movable end. The side plate unit comprises a side plate front portion which is connected to a preceding side plate unit, a side plate rear portion which is connected to a subsequent side plate unit, and a flexible coupling portion integrally intervened between the side plate front portion and the side plate rear portion. The side plate unit includes an outer circumferential side linear position holding mechanism and an outer circumferential side flexional position restricting mechanism at a side plate front portion on a flexional outer circumferential side rather than a coupling portion. The side plate unit further includes an inner circumferential side flexional position restricting mechanism and an inner circumferential side linear position holding mechanism at a side plate rear portion on a flexional inner circumferential side rather than the coupling portion.

Engineering plastic resins such as polyamide 6, polyamide 12, polyamide 46, polyamide 66, acryl, polyacetal and the like, which resist flexion strain liable to occur during a flexional operation so that excellent dimensional stability is exhibited, may be used for the side plate, the side plate unit, and the connecting plate used in the cable or the like protection and guide device of the present invention, Particularly, when the above-mentioned members such as the side plate unit and others are molded by use of a fatigue resistant resin material of an elastomer or rubber component-formulated polyamide resin or polybutylene terephthalate, since the elastomer or rubber component-formulated polyamide resin or polybutylene terephthalate adds flexibility, impact resistance, and fatigue resistance. Thus the elastomer or rubber component-formulated polyamide resin or polybutylene terephthalate is preferred.

And although the connecting plates used in the cable protection and guide device according to the present invention are detachably bridged over the flexional inner circumferential side and the flexional outer circumferential side of the side plate units, they may be bridged over every side plate unit or intermittently in the longitudinal direction.

EXAMPLE

A cable protection and guide device 100, which is an example of the present invention, will be described with reference to FIGS. 1 and 7 below.

Figure 2:
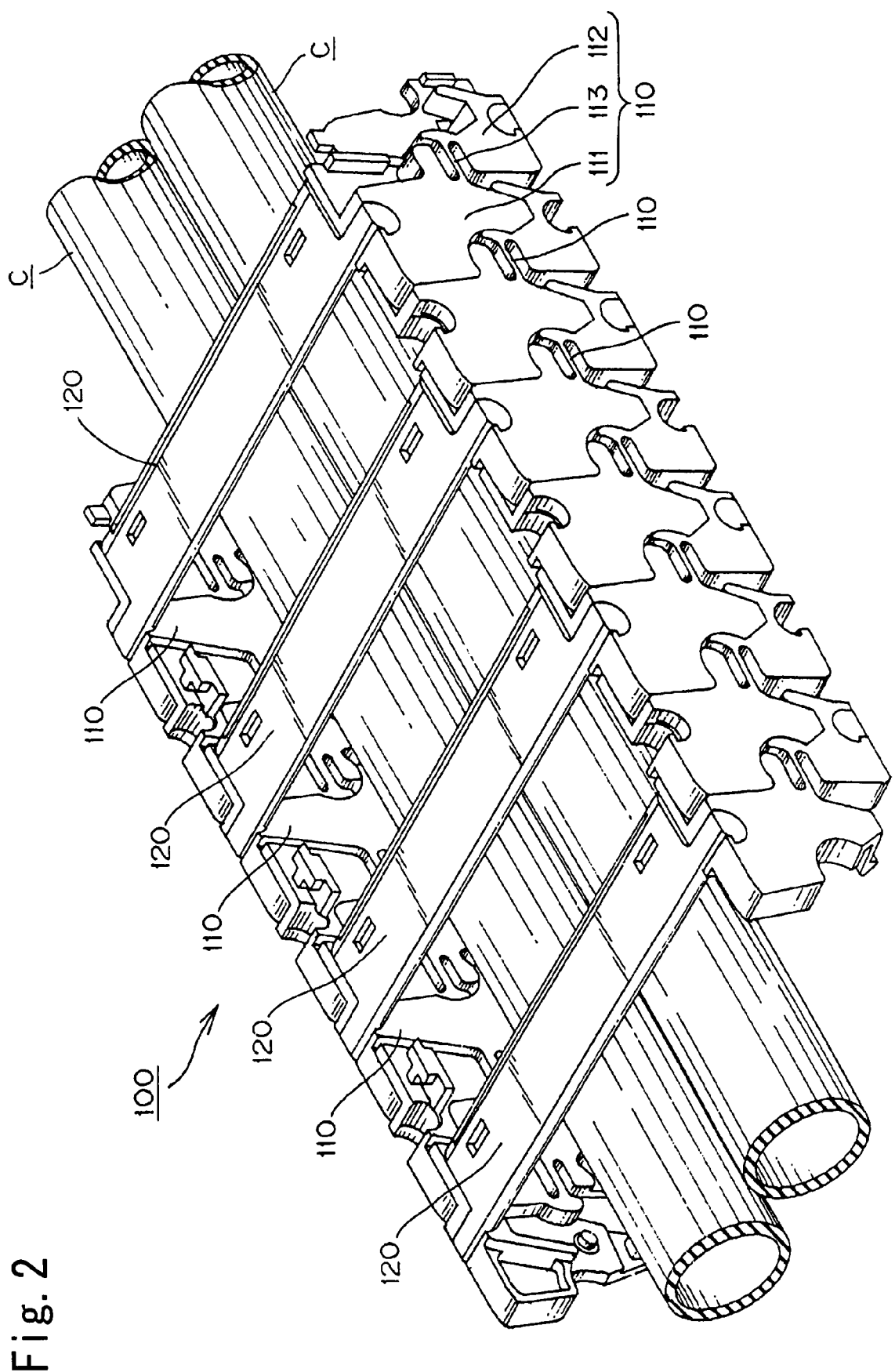
FIG. 2 is an enlarged view of a linear region shown in FIG. 1.
Figure 3:
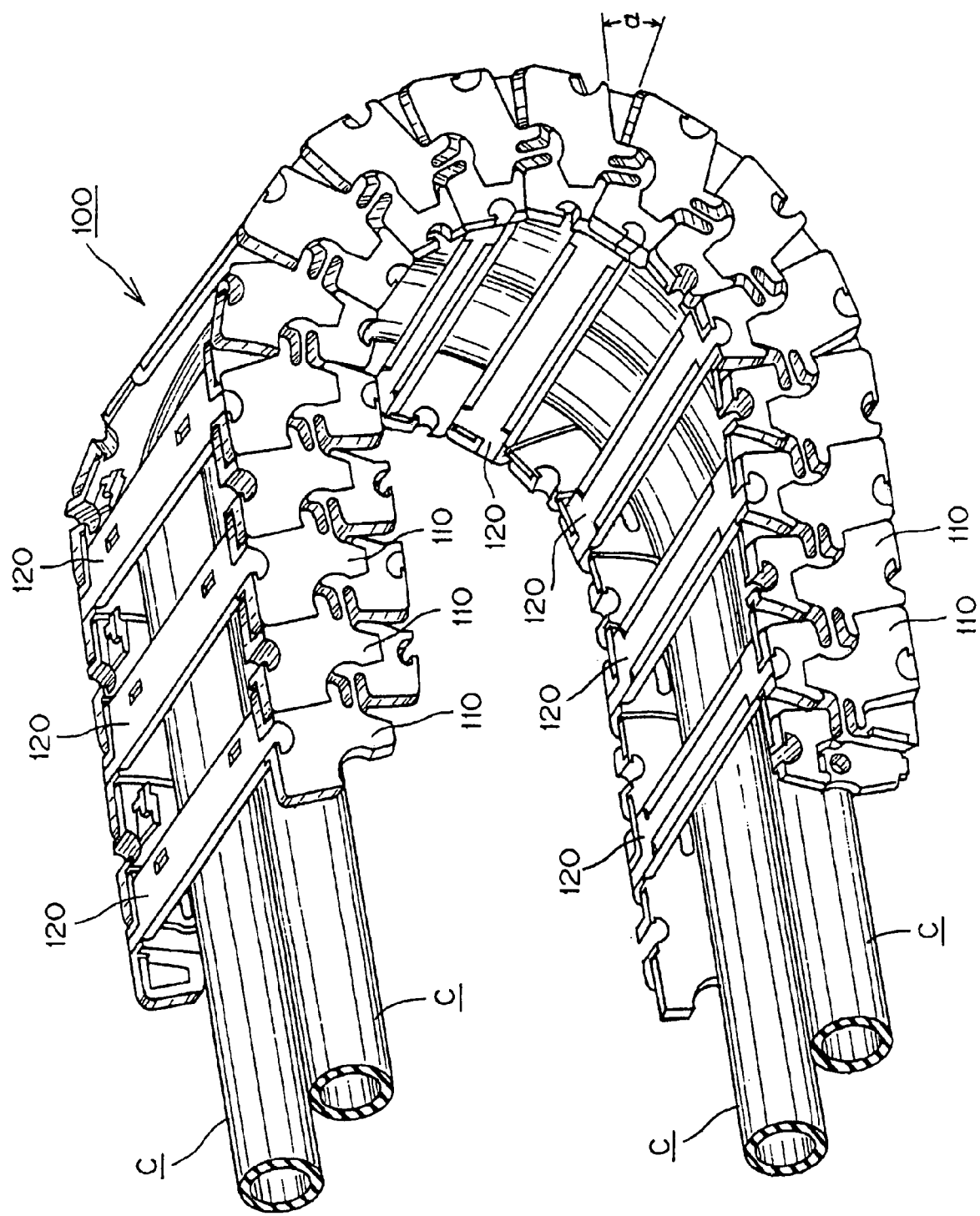
FIG. 3 is an enlarged view of a flexed region shown in FIG. 1.
Figure 4:
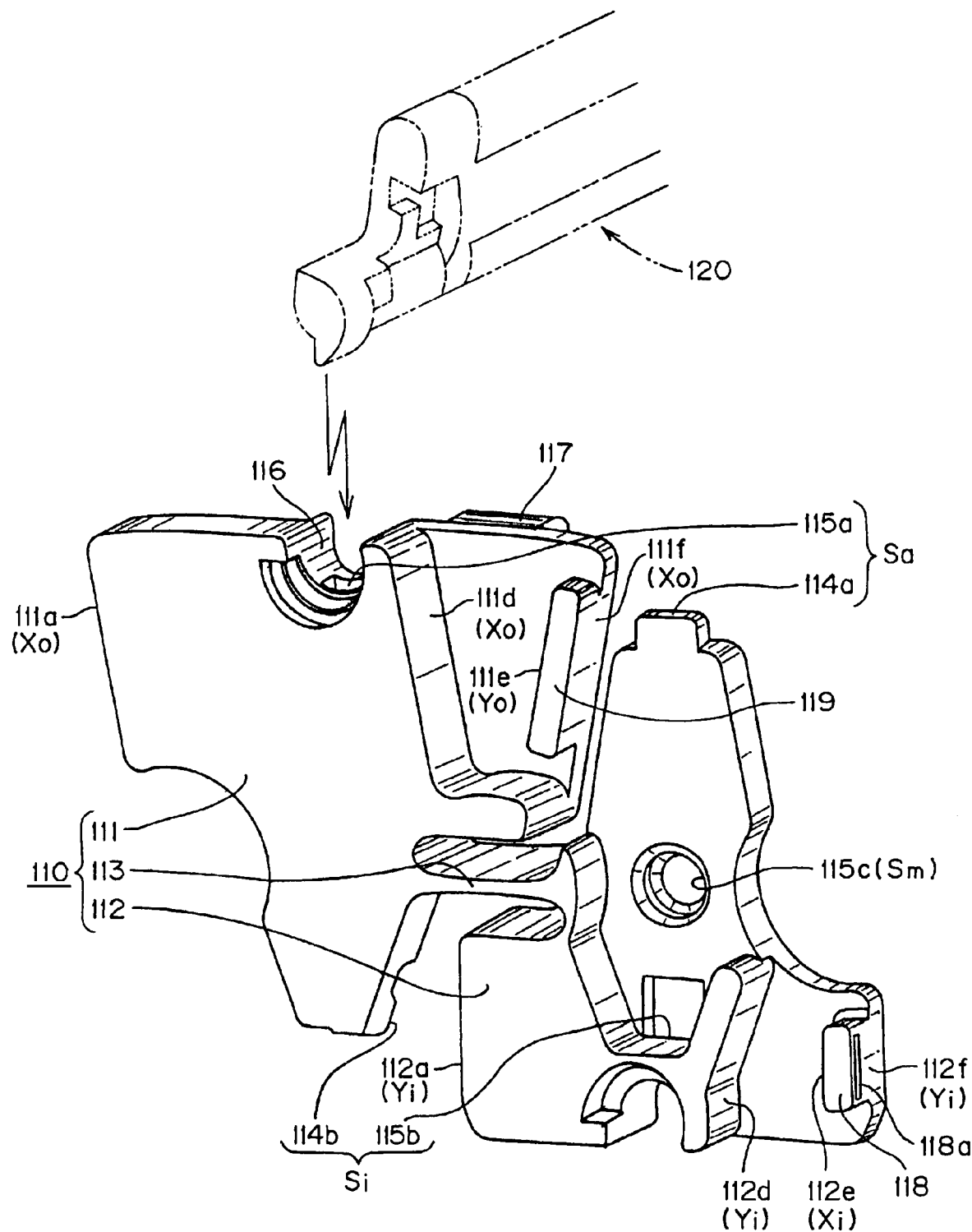
FIG. 4 is a perspective view viewed from the outside of the side plate unit used in the present example.
Figure 5:
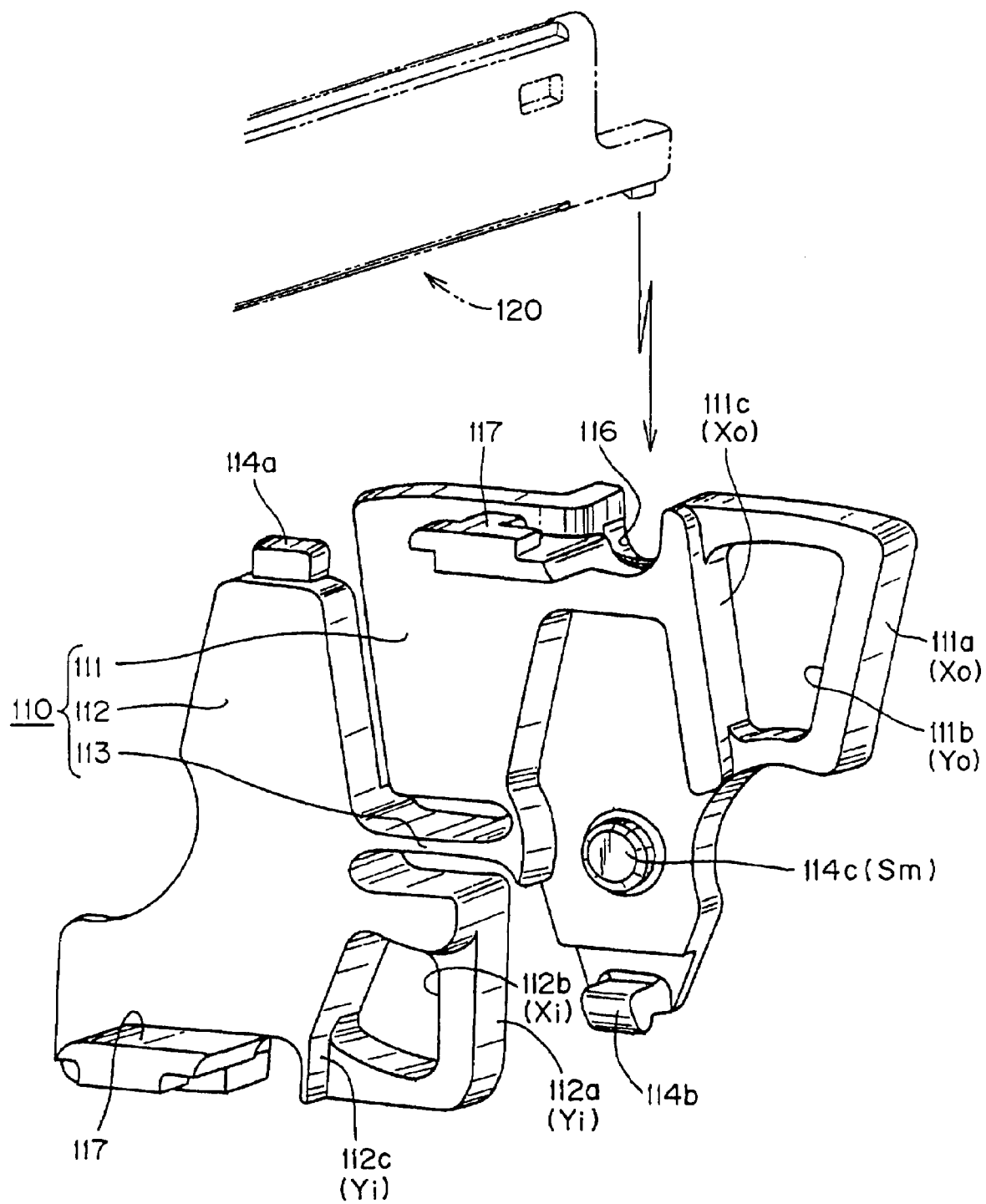
FIG. 5 is a perspective view viewed from the inside of the side plate unit used in the present example.
Figure 6:
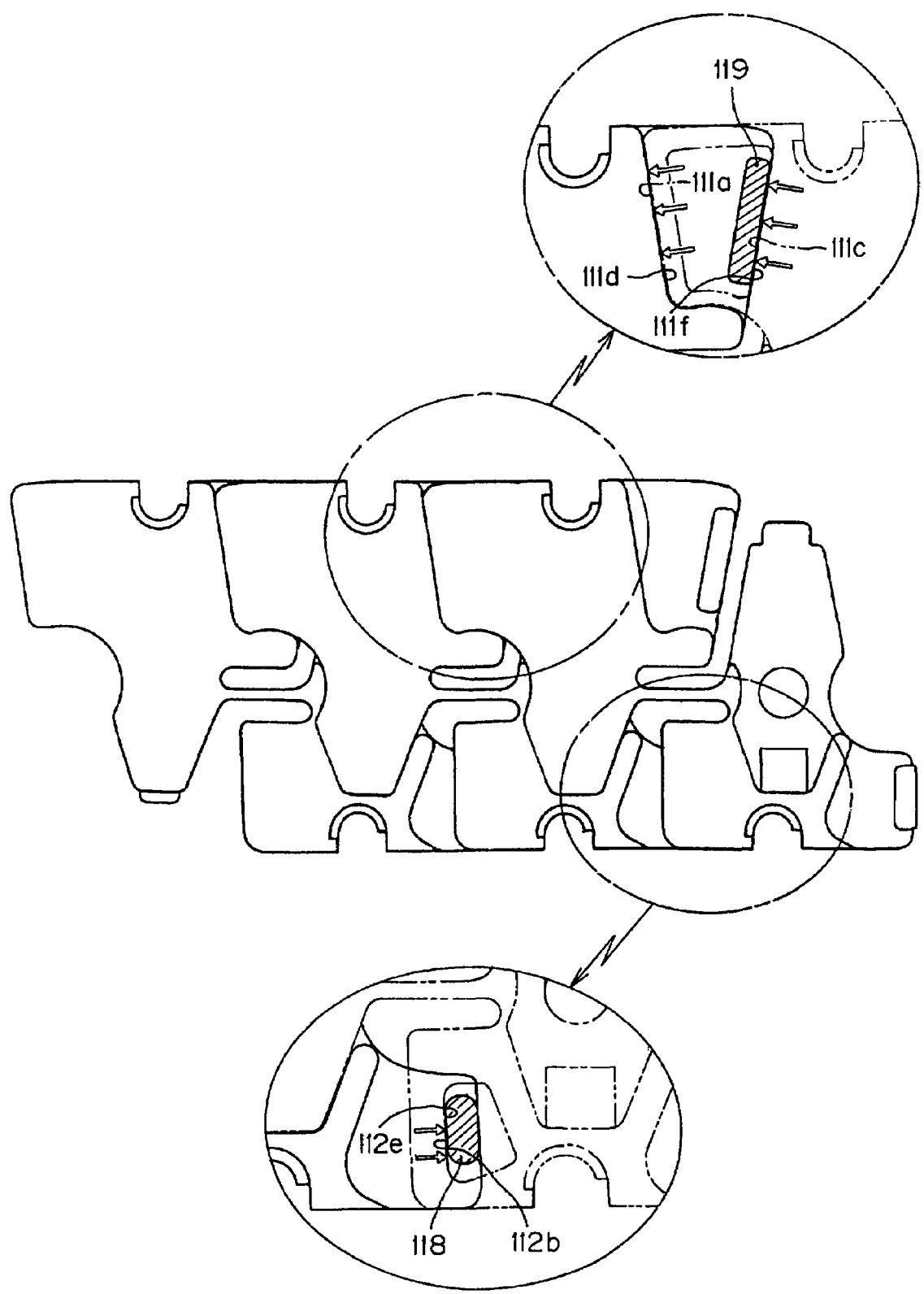
FIG. 6 is a side view for explaining a linear position holding state of a side plate unit and a partially enlarged view.

Here, FIG. 1 is an entire view showing a use form of a cable or the like protection and guide device 100 which is an example according to the present invention. FIG. 2 is an enlarged view of a linear region shown in FIG. 1. FIG. 3 is an enlarged view of a flexed region shown in FIG. 1. FIG. 4 is a perspective view viewed from the outside of the side plate unit used in the present example. FIG. 5 is a perspective view viewed from the inside of the side plate unit used in the present example. FIG. 6 is a side view for explaining a linear position holding state of a side plate unit and a partially enlarged view. FIG. 7 is a side view for explaining a flexional position restricting state of a side plate unit and a partially enlarged view.

The cable protection and guide device 100 of the present example is used for protecting and guiding cables or the like C such as electric cables which connect between a movable portion and a stationary portion in a semiconductor device, a pharmacy development testing device, and a door opening/closing device for a vehicle. Transmission and supply of electric signals and hoses which supply pressure liquid or pressure gas is safely and reliably accomplished. The device is longitudinally connected to connect between the movable portion and the stationary portion (not shown). Further the cable or the like protection and guide device 100 exhibits a linear position or a flexional position in accordance with relatively remote movement conditions between the movable portion and the stationary portion.

And as shown in FIGS. 1 to 3, the cable or the like protection and guide device 100 is formed in such a manner that a number of right and left pairs of spaced plate units 110, 110 are connected to each other in a longitudinal direction of the cable from a mounting fixed end (F) attached to the above-mentioned stationary portion toward a mounting movable end (M) attached to the movable portion. Connecting plates 120 are respectively bridged over flexional inner circumferential sides and flexional outer circumferential sides of these side plate units 110, 110 with alternate arrangement intervals of the side plate units 110, 110 so that cables or the like C are accommodated in cable accommodating space with a rectangular section, surrounded by the right and left pair of side plate units 110, 110 and the connecting plates 120, 120 along the longitudinal direction.

It is noted that although in the cable or the like protection and guide device 100 of this example, the connecting plates 120 are bridged in alternate arrangement intervals with respect to the side plate units 110, 110 connected to each other. Alternatively they mat be arranged such that they are bridged over every side plate.

As shown in FIG. 1, a pair of right and left mounting brackets 130, 130 are detachably connected to a pair of right and left side plate units 110, 110 adjacent to a mounting fixed end (F), respectively, and a pair of right and left mounting brackets 130, 130 are detachably connected to a pair of right and left side plate units 110, 110 adjacent to a mounting movable end (M), respectively.

Then the above-mentioned side plate units 110, 110 will be described in detail below.

As shown in FIGS. 4 and 5, a pair of right and left spaced side plate units 110, 110 is molded by use of a fatigue resistant material of a rubber component-formulated polyamide resin and is formed symmetrically.

And the side plate unit comprises a side plate front portion 111, which is connected to a preceding side plate unit 110, a side plate rear portion 112, which is connected to a subsequent side plate unit 110, and a flexible coupling portion 113 integrally intervened between the side plate front portion 111 and the side rear portion 112.

In this case, since the coupling portion 113 composed of a polyamide rubber composition, which is a fatigue resistant resin, is flexibly adapted to repeated flexions, the cable or the like protection and guide device 100 can exhibit excellent fatigue resistance to repeated flexions. Further, since the side plate front portion 111 and side plate rear portion 112 concentrate flexion strain liable to generate during a flexional operation to absorb it so that the cable or the like protection and guide device 100 can exhibit excellent stability of a cable holding form.

A flexional outer circumferential side concave portion/convex portion engagement mechanism is provided between the side plate rear portion 112 of the preceding side plate (not shown) and the side plate front portion 111 of the side plate unit 110 subsequently connected to the side plate rear portion 112 are, as shown in FIGS. 4 and 5. A flexional inner circumferential side concave portion/convex portion engagement mechanism Si and a concave portion/convex portion engagement mechanism Sm adopted in the vicinity of a coupling portion 113, which are engaged with each other. And side plate units 110, 110 adjacent to each other through these concave portion/convex portion engagement mechanisms So, Si and Sm are attachable to and detachable from each other, and a maintenance of the cable protection and guide device 100 can be easily performed during connection and disconnection of the side plate units 110, 110.

The concave portion/convex portion engagement mechanism So adopted on the flexional outer circumferential side of the example of the present invention comprises a horn-shaped first engagement protrusion 114a and a recess-shaped first hole 115a which detachably engages with the engagement protrusion 114a. The concave portion/convex portion engagement mechanism Si adopted on the flexional inner circumferential side comprises a second engagement protrusion 114b composed of a hook-shaped engagement hook and a recess-shaped second hole 115b which detachably engages the engagement protrusion 114b.

The concave portion/convex portion engagement mechanism Sm adopted in the vicinity of a coupling portion 113 of the side plate unit 110 comprises a third engagement protrusion 114c composed of a cylindrical engagement pin and a dimple-shaped third hole 115c which detachably engages the engagement protrusion 114c.

It is noted that the reference numerals 116 shown in FIGS. 4 and 5 denote a fitting shaft hole for mounting the above-mentioned connecting plate 120 on the side plate unit 110, and the reference numerals 117 denote a tongue piece supporting portion for supporting the connecting plate 120 attached to the side plate unit 110 in a stable horizontal state.

Further, since, as shown in FIGS. 4 to 7, the side plate unit 110 includes an outer circumferential side linear position holding mechanism Xo at an outer circumferential side plate front portion 111 rather than the above-mentioned coupling portion 113 and since the side plate unit includes an inner circumferential side linear position holding mechanism Xi at a flexional inner circumferential side plate rear portion 112 rather than the coupling portion 113, when cables or the like protection and guide device are transferred from a flexional position restricting state to a linear position holding state, the contact position between adjacent side plate units 110, 110 is divided into two parts on a flexional outer circumferential side and a flexional inner circumferential side with the coupling portion sandwiched therebetween. Further, since, the side plate unit 110 includes an outer circumferential side flexional position restricting mechanism Yo at an outer circumferential side plate front portion 111 rather than the above-mentioned coupling portion 113 and since the side plate unit includes an inner circumferential side flexional position restricting mechanism Yi at a flexional inner circumferential side plate rear portion 112 rather than the coupling portion 113, when cables or the like protection and guide device are transferred from a linear position holding state to a flexional position restricting state, the contact position between adjacent side plate units 110, 110 is divided into two parts on a flexional outer circumferential side and a flexional inner circumferential side with the coupling portion sandwiched therebetween. Therefore, even if the cable protection and guide device is transferred to any one of the flexional position restricting state and the linear position holding state, contact impact force liable to occur in the adjacent side plate units 110, 110 is dispersed whereby noise reduction is accomplished.

Figure 7:
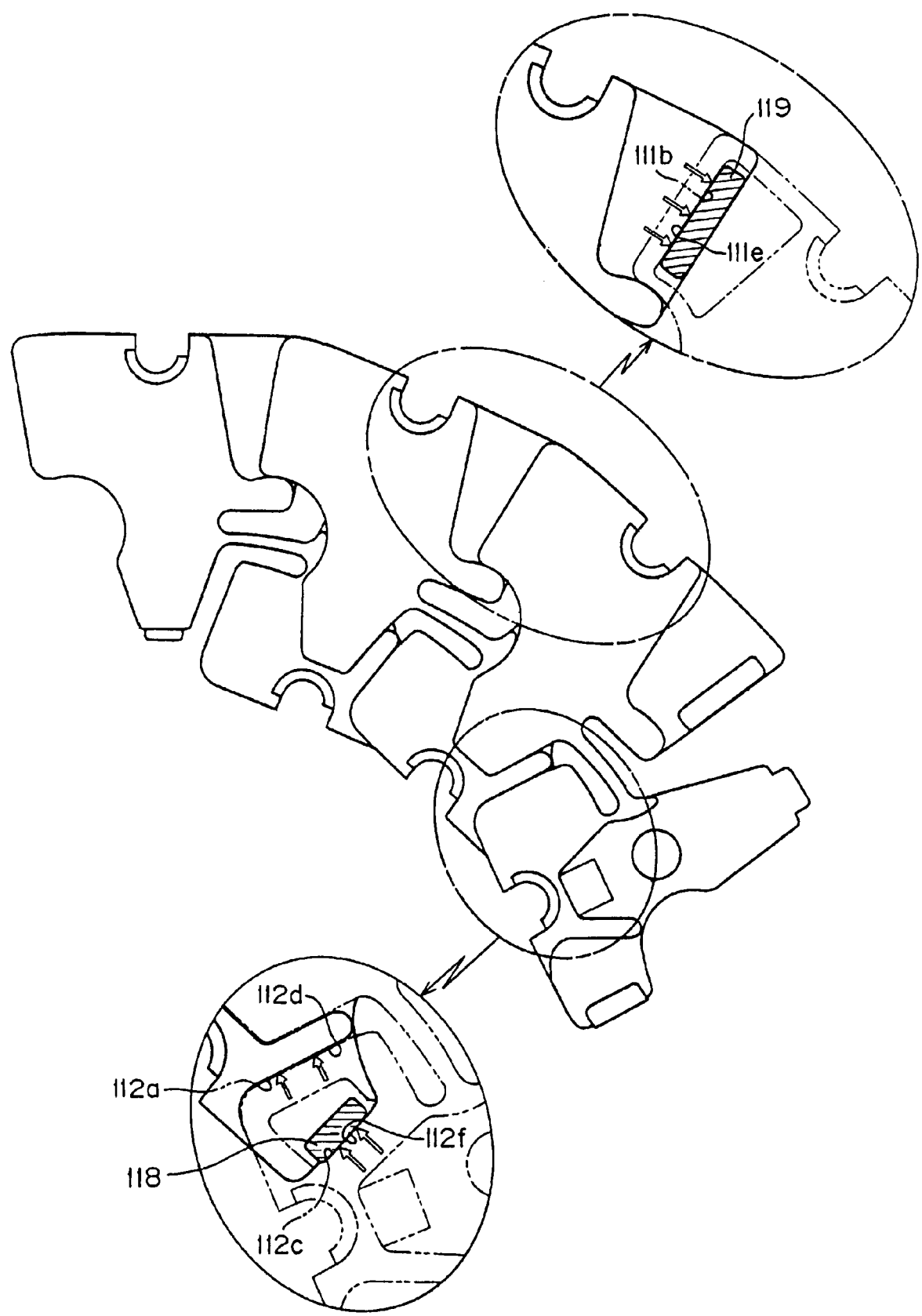
FIG. 7 is a side view for explaining a flexional position restricting state of a side plate unit and a partially enlarged view.

It is noted that in FIGS. 6 and 7 solid lines in partially enlarged views shown each denote a preceding side plate unit 110, hypothetical (dashed) lines each denote a subsequent side plate unit 110, and arrows denote pressing force, which becomes impact force, when adjacent side plate units 110, 110 abut on each other.

The outer circumferential side linear position holding mechanism Xo is formed between a fourth abutment end surface 111d molded in a side plate front portion 111 positioned on the flexional outer circumferential side rather than the coupling portion 113 of a preceding side plate unit 110 and a first abutment end surface 111a molded in a side plate front portion 111 of a subsequent side plate unit 110, and, Xo is formed between a sixth abutment end surface 111f offset-molded in a side plate front portion 111 positioned on the flexional outer circumferential side rather than the coupling portion 113 of a preceding side plate unit 110 in a stepped manner and a third abutment end surface 111c offset-molded in a side plate front portion 111 of a subsequent side plate unit 110 in a stepped manner.

The inner circumferential side linear position holding mechanism Xi is formed between a fifth abutment end surface 112e protrudently molded in a side plate rear portion 112 of a side plate unit 110 positioned on the flexional inner circumferential side rather than the coupling portion 113 of a preceding side plate unit 110 and a second abutment end surface 112b molded in a side plate rear portion 112 of a subsequent side plate 110.

An inner circumferential side linear position holding mechanism Xi is arranged so that it abuts on a side plate unit 110 in an earlier position than the outer circumferential side linear position holding mechanism Xo and when the device is transferred from the flexional position restricting state to the linear position holding state, the contact position is divided to two parts on a flexional outer circumferential side and a flexional inner circumferential side and the timing of contact impact noise liable to occur is shifted so that peak sound and periodical sounds are suppressed and further noise reduction is accomplished.

Further, the outer circumferential side flexional position restricting mechanism Yo is formed between a fifth abutment end surface 111e protrudently molded in a side plate front portion 111 positioned on the flexional outer circumferential side rather than the coupling portion 113 of a preceding side plate unit 110 and a second abutment end surface 111b molded in a side plate front portion 111 of a subsequent side plate unit 110.

The inner circumferential side flexional position restricting mechanism Yi is respectively formed between a fourth abutment end surface 112d molded in a side plate rear portion 112 positioned on the flexional inner circumferential side rather than the coupling portion 113 of a preceding side plate unit 110 and a first abutment end surface 112a molded in a side plate rear portion 112 of a subsequent side plate unit 110 and, Yi is formed between a sixth abutment end surface 112f protrudently molded in a side plate rear portion 112 positioned on the flexional inner circumferential side rather than the coupling portion 113 of a preceding side plate unit 110 and a second abutment end surface 112c offset-molded in a side plate rear portion 112 of a subsequent side plate unit 110 in a stepped manner.

An inner circumferential side flexional position restricting mechanism Yi is arranged so that it abuts on a side plate unit 110 at an earlier position time than the outer circumferential side flexional position restricting mechanism Yo and when the cable protection and guide device is transferred from the linear position holding state to the flexional position restricting state, the contact position is divided to two parts on a flexional outer circumferential side and a flexional inner circumferential side and the timing of contact impact noise is shifted so that peak sound and periodical sounds are suppressed and further noise reduction is accomplished.

Further, the above-mentioned outer circumferential side linear position holding mechanism Xo and the outer circumferential side flexional position restricting mechanism Yo each includes a larger abutment surface than the inner circumferential side linear position holding mechanism Xi and the inner circumferential side flexional position restricting mechanism Yi. When the cable protection and guide device is transferred from the linear position holding state to the flexional position restricting state or from the flexional position restricting state to the linear position holding state, even if large impact force is loaded on the outer circumferential side than the inner circumferential side, the impact surface pressure against the large impact force is reduced to the same level as on the inner circumferential side and a reliable restriction of the flexional position or a reliable holding of the linear position is accomplished. Thus, wear of the outer circumferential side linear position holding mechanism Xo and the outer circumferential side flexional position restricting mechanism Yo can be prevented.

Further, parts of the inner circumferential side linear position holding mechanism Xi and inner circumferential side flexional position restricting mechanism Yi are each composed of an elastically deformable stop member 118.

Therefore, when cables or the like protection and guide device are transferred from a linear position holding state to a flexional position restricting state or from a flexional position restricting state to a linear position holding state, contact impact force loaded on the inner circumferential side is first absorbed by the stop member 118 whereby contact impact sound is reduced and wear and tear of the stop member 118 is prevented to exhibit excellent fatigue resistance.

Further, the stop member 118 includes a first stop surface 118a which precedently abuts on the adjacent side plate unit, and, a second stop surface (sixth abutment surface 112f) which abuts thereon more slowly than the first stop surface 118a. In other words since the stop member 118 has the first stop surface 118a which more precedently abuts on the adjacent side plate unit than the second stop surface, the cable C is transferred from a linear position holding state to a flexional position restricting state or from a flexional position restricting state to a linear position holding state, the contact impact force loaded on the stop member 118 is absorbed by the first stop surface 118a and the stop surface 112f in two steps, and the concentrated load of the contact impact force is avoided to exhibit excellent fatigue resistance. As a result noise reduction is further accomplished.

It is noted that parts of the above-mentioned outer circumferential side linear position holding mechanism Xo and outer circumferential side flexional position restricting mechanism Yo are composed of a stop member 119 in which the outer circumferential side fifth abutment end surface 111e and sixth abutment end surface 111f are formed.

Therefore, the thus obtained cable or the like protection and guide device 100 reliably holds a linear position without loading on the coupling portion 113 by causing an outer circumferential side linear position holding mechanism Xo on the flexional outer circumferential side and an inner circumferential side linear position holding mechanism Xi on the flexional inner circumferential side to abut on each other in a state where an inner circumferential side flexional position restricting mechanism Yi on the flexional inner circumferential side and an outer circumferential side flexional position restricting mechanism Yo on the flexional outer circumferential side are each opened at the time of the linear position holding. The thus obtained cable protection and guide device reliably holds a flexional position without loading on the coupling portion 113 by causing an inner circumferential side flexional position restricting mechanism Yi on the flexional inner circumferential side and an outer circumferential side flexional position restricting mechanism Yo on the flexional outer circumferential side to abut on each other in a state where an outer circumferential side linear position holding mechanism Xo on the flexional outer circumferential side and an inner circumferential side linear position holding mechanism Xi on the flexional inner circumferential side are each opened at the time of the flectional position restriction. As a result the contact impact noise between side plate units 110 liable to occur at the time of linear position holding and flexional position restriction when accommodated cables or the like C are transferred from the mounting fixed end F and the mounting movable end M, is dispersedly suppressed. Noise reduction is accomplished and excellent fatigue resistance of the side plate unit 10 can be exhibited. Thus the effects of the invention are very large.

DESCRIPTION OF REFERENCE NUMERALS

100 . . . Cable or the like protection and guide device
110 . . . Side plate unit
111 . . . Side plate front portion
111a . . . First abutment end surface of side plate front portion
111b . . . Second abutment end surface of side plate front portion
111c . . . Third abutment end surface of side plate front portion
111d . . . Fourth abutment end surface of side plate front portion
111e . . . Fifth abutment end surface of side plate front portion
111f . . . Sixth abutment end surface of side plate front portion
112 . . . Side plate rear portion
112a . . . First abutment end surface of side plate rear portion
112b . . . Second abutment end surface of side plate rear portion
112c . . . Third abutment end surface of side plate rear portion
112d . . . Fourth abutment end surface of side plate rear portion
112e . . . Fifth abutment end surface of side plate rear portion
112f . . . Sixth abutment end surface of side plate rear portion
113 . . . Coupling portion
114a . . . Flexional outer circumferential side first engagement protrusion
114b . . . Flexional inner circumferential side second engagement protrusion
114c . . . Third engagement protrusion
115a . . . Flexional outer circumferential side first hole to be engaged
115b . . . Flexional inner circumferential side second hole to be engaged
115c . . . Third hole to be engaged
116 . . . Fitting engagement hole
117 . . . Tongue piece supporting portion
118 . . . Flexional inner circumferential side stop member
118a . . . First stop surface
119 Flexional outer circumferential side stop member
120 . . . Connecting plate
121 . . . Supporting shaft
130 . . . Mounting bracket
C . . . Cables or the like
So, Si, Sm . . . Concave portion/convex portion engagement mechanism Xo . . . Outer circumferential side linear position holding mechanism Yo . . . Outer circumferential side flexional position restricting mechanism Xi . . . Inner circumferential side linear position holding mechanism Yi . . . Inner circumferential side flexional position restricting mechanism α . . . Maximum opening angle between flexional position restricting surfaces Those skilled in the art will readily recognize that the invention has been set forth by way of example only and that many changes may be made to the invention without departing from the spirit and the scope of the invention as set forth in the claims below.

The invention claimed is:

1. A cable protection and guide device comprising:
a number of pairs of right and left spaced side plates are articulately connected to each other in a longitudinal direction from a mounting fixed end toward a mounting movable end enabling said side plates to form a flexional circumferential bend having a flexional inner circumferential side and flexional outer circumferential side; each of said side plates includes a flexional inner circumferential side residing during bending on said flexional inner circumferential side of said bend; each of said side plates includes an outer circumferential side residing during bending on said outer flexional circumferential side of said bend;
connecting plates are detachably bridged over said flexional inner circumferential sides and said flexional outer circumferential sides of said side plates in predetermined intervals;
a cable is accommodated in a cable accommodating space surrounded by said side plates and said connecting plates along said longitudinal direction from the mounting fixed end toward the mounting movable end;
each of said side plates comprises a side plate front portion which is connected to a preceding side plate, a side plate rear portion which is connected to a subsequent side plate, and a flexible coupling portion integrally intervened between said side plate front portion and said side plate rear portion;
each of said side plates includes an outer circumferential side linear position holding mechanism and an outer circumferential side flexional position restricting mechanism at a side plate front portion on said flexional outer circumferential side; and,
each of said side plates includes an inner circumferential side flexional position restricting mechanism and an inner circumferential side linear position holding mechanism at a side plate rear portion on said flexional inner circumferential side.

2. A cable protection and guide device according to claim 1 wherein each of said inner circumferential side linear position holding mechanisms abuts an adjacent side plate and each of said outer circumferential side linear position holding mechanisms abuts an adjacent side plate.

3. A cable protection and guide device according to claim 1 wherein each of said inner circumferential side flexional position restricting mechanisms abuts an adjacent side plate and each of said outer circumferential side flexional position restricting mechanisms abuts an adjacent side plate.

4. A cable protection and guide device according to claim 2 wherein each of said inner circumferential side flexional position restricting mechanisms abuts an adjacent side plate and each of said outer circumferential side flexional position restricting mechanisms abuts an adjacent side plate.

5. A cable protection and guide device according to claim 1 wherein:
said outer circumferential side linear position holding mechanism includes an outer circumferential side linear position holding mechanism abutment surface and said outer circumferential side flexional position restricting mechanism includes an outer circumferential side flexional position restricting mechanism abutment surface;
said inner circumferential side linear position holding mechanism includes an inner circumferential side linear position holding mechanism abutment surface and said inner circumferential side flexional position restricting mechanism includes an inner circumferential side flexional position restricting mechanism abutment surface; and,
said abutment surfaces of said outer circumferential side flexional position restricting mechanism and said outer circumferential side flexional position restricting mechanism being larger than said abutment surfaces of said inner circumferential side linear position holding mechanism and said inner circumferential side flexional position restricting mechanism.

6. A cable protection and guide device according to claim 2 wherein:
said outer circumferential side linear position holding mechanism includes an outer circumferential side linear position holding mechanism abutment surface and said outer circumferential side flexional position restricting mechanism includes an outer circumferential side flexional position restricting mechanism abutment surface;
said inner circumferential side linear position holding mechanism includes an inner circumferential side linear position holding mechanism abutment surface and said inner circumferential side flexional position restricting mechanism includes an inner circumferential side flexional position restricting mechanism abutment surface; and,
said abutment surfaces of said outer circumferential side flexional position restricting mechanism and said outer circumferential side flexional position restricting mechanism being larger than said abutment surfaces of said inner circumferential side linear position holding mechanism and said inner circumferential side flexional position restricting mechanism.

7. A cable protection and guide device according to claim 3, wherein:
said outer circumferential side linear position holding mechanism includes an outer circumferential side linear position holding mechanism abutment surface and said outer circumferential side flexional position restricting mechanism includes an outer circumferential side flexional position restricting mechanism abutment surface;
said inner circumferential side linear position holding mechanism includes an inner circumferential side linear position holding mechanism abutment surface and said inner circumferential side flexional position restricting mechanism includes an inner circumferential side flexional position restricting mechanism abutment surface; and,
said abutment surfaces of said outer circumferential side flexional position restricting mechanism and said outer circumferential side flexional position restricting
mechanism being larger than said abutment surfaces of said inner circumferential side linear position holding mechanism and said inner circumferential side flexional position restricting mechanism.

8. A cable protection and guide device according to claim 4 wherein:

said outer circumferential side linear position holding mechanism includes an outer circumferential side linear position holding mechanism abutment surface and said outer circumferential side flexional position restricting mechanism includes an outer circumferential side flexional position restricting mechanism abutment surface;

said inner circumferential side linear position holding mechanism includes an inner circumferential side linear position holding mechanism abutment surface and said inner circumferential side flexional position restricting mechanism includes an inner circumferential side flexional position restricting mechanism abutment surface; and, said abutment surfaces of said outer circumferential side flexional position restricting mechanism and said outer circumferential side flexional position restricting mechanism being larger than said abutment surfaces of said inner circumferential side linear position holding mechanism and said inner circumferential side flexional position restricting mechanism.

9. A cable protection and guide device according to claim 1 wherein:

said inner circumferential side linear position holding mechanism and said inner circumferential side flexional position restricting mechanism each include an elastically deformable stop member.

10. A cable protection and guide device according to claim 2 wherein:

said inner circumferential side linear position holding mechanism and said inner circumferential side flexional position restricting mechanism each include an elastically deformable stop member.

11. A cable protection and guide device according to claim 3 wherein:

said inner circumferential side linear position holding mechanism and said inner circumferential side flexional position restricting mechanism each include an elastically deformable stop member.

12. A cable protection and guide device according to claim 4 wherein:

said inner circumferential side linear position holding mechanism and said inner circumferential side flexional position restricting mechanism each include an elastically deformable stop member.

13. A cable protection and guide device according to claim 5 wherein:

said inner circumferential side linear position holding mechanism and said inner circumferential side flexional position restricting mechanism each include an elastically deformable stop member.

14. A cable protection and guide device according to claim 6 wherein:

said inner circumferential side linear position holding mechanism and said inner circumferential side flexional position restricting mechanism each include an elastically deformable stop member.

15. A cable protection and guide device according to claim 7 wherein:

said inner circumferential side linear position holding mechanism and said inner circumferential side flexional position restricting mechanism each include an elastically deformable stop member.

16. A cable protection and guide device according to claim 8 wherein:

said inner circumferential side linear position holding mechanism and said inner circumferential side flexional position restricting mechanism each include an elastically deformable stop member.

17. A cable protection and guide device according to claim 1 further comprising:

a stop member; and, said stop member includes a first stop surface and a second stop surface both of which abut an adjacent side plate.

18. A cable protection and guide device according to claim 1 further comprising a stop member and wherein:

said coupling portion and said stop member are molded from a fatigue resistant resin material of a polyamide resin or a polybutylene terephthalate resin formulated with a component of elastomer or rubber.

* * * * *